United States Patent
Tsai (10) Patent No.: US 12,258,089 B2
(45) Date of Patent: Mar. 25, 2025

(54) BICYCLE TRACKING DEVICE ASSEMBLY

(71) Applicant: Ming-Ta Tsai, New Taipei (TW)

(72) Inventor: Ming-Ta Tsai, New Taipei (TW)

(73) Assignee: DAH KEN INDUSTRIAL CO., LTD.

( * ) Notice: Subject to any disclaimer, the term of this patent is extended or adjusted under 35 U.S.C. 154(b) by 26 days.

(21) Appl. No.: 18/094,392

(22) Filed: Jan. 9, 2023

(65) Prior Publication Data
US 2024/0227966 A1    Jul. 11, 2024

(51) Int. Cl.
*B62J 45/42*    (2020.01)
*B62J 45/41*    (2020.01)

(52) U.S. Cl.
CPC ........... *B62J 45/42* (2020.02); *B62J 45/41* (2020.02)

(58) Field of Classification Search
CPC . B62J 45/41; B62J 45/42; B62J 45/421; B62J 45/422; B62J 45/423; B62J 50/225; B62K 21/18; Y10T 403/7064; Y10T 403/7066; Y10T 403/7067; Y10T 403/7069; Y10T 403/32501
See application file for complete search history.

(56) References Cited

U.S. PATENT DOCUMENTS

| | | | | |
|---|---|---|---|---|
| 723,099 A | * | 3/1903 | White | B41B 1/20 254/42 |
| 1,073,838 A | * | 9/1913 | Barton | B41B 1/20 425/DIG. 129 |
| 1,994,303 A | * | 3/1935 | Clark | B62K 21/12 403/109.5 |
| 4,410,197 A | * | 10/1983 | St. Hillaire | B62K 21/22 280/279 |
| 5,197,349 A | * | 3/1993 | Herman | B62K 21/18 411/79 |
| 5,201,242 A | * | 4/1993 | Chi | B62K 21/18 403/370 |
| 5,536,104 A | * | 7/1996 | Chen | B62K 21/18 403/370 |
| 5,540,457 A | * | 7/1996 | Johnson | B62K 21/06 403/370 |
| 5,605,075 A | * | 2/1997 | Chi | F16B 7/025 403/370 |
| 5,680,798 A | * | 10/1997 | Luen | B62K 21/06 403/370 |

(Continued)

FOREIGN PATENT DOCUMENTS

TW    201431734 A    *    8/2014

*Primary Examiner* — Jonathan Liu
*Assistant Examiner* — Guang H Guan (57) ABSTRACT

A bicycle tracker mounting assembly is provided. The bicycle tracker mounting assembly includes a connection unit mounted on an inner wall of a bicycle tube. The connection unit includes a first shift block, a second shift block, a first carrier, a second carrier, and a positioning member. The first shift block and the second shift block have a first guiding surface and a second guiding surface, respectively. The first guiding surface and the second guiding surface are complementary to each other. The positioning member passes through the first shift block and the second shift block, and the connection unit is configured to be fixed to the inner wall of the bicycle tube or disengaged from the inner wall of the bicycle tube by rotating the positioning member to displace the first shift block and the second shift block.

8 Claims, 6 Drawing Sheets

(56) References Cited

U.S. PATENT DOCUMENTS

| | | | | |
|---|---|---|---|---|
| 5,893,574 | A * | 4/1999 | Campagnolo | B62K 21/06 280/279 |
| 5,971,415 | A * | 10/1999 | Lin | B62K 21/06 280/280 |
| 6,322,283 | B1 * | 11/2001 | Chen | B62K 21/18 403/345 |
| 6,711,966 | B2 * | 3/2004 | Chuang | B62J 6/03 74/551.8 |
| 7,645,087 | B1 * | 1/2010 | Lin | B62K 21/18 403/109.5 |
| 7,722,115 | B2 * | 5/2010 | Biro | B62J 1/08 297/215.15 |
| 7,815,206 | B2 * | 10/2010 | Tseng | B62K 21/18 280/279 |
| 8,550,013 | B2 * | 10/2013 | Carnevali | F16B 7/14 248/346.03 |
| 8,662,517 | B2 * | 3/2014 | King | F16C 25/06 280/270 |
| 10,399,631 | B2 * | 9/2019 | DeGray | B62K 21/18 |
| 10,759,486 | B2 * | 9/2020 | Botti | B62K 9/02 |
| 11,718,360 | B1 * | 8/2023 | McAllister | A63B 69/16 280/288.4 |
| 11,932,338 | B2 * | 3/2024 | Tsai | B62J 3/12 |
| 2023/0182849 | A1 * | 6/2023 | Young | B62H 5/20 224/412 |
| 2024/0227966 | A1 * | 7/2024 | Tsai | B62J 45/42 |

\* cited by examiner

BICYCLE TRACKING DEVICE ASSEMBLY

FIELD OF THE DISCLOSURE

The present disclosure relates to the bicycle field, and more particularly to a bicycle tracker mounting assembly.

BACKGROUND OF THE DISCLOSURE

In recent years, people advocate a LOHAS life. Bicycles are popular year by year due to the advantages of taking into account sports and leisure, and no energy consumption. Various bicycle manufacturers continue to improve the materials and structures of bicycles, for example, to conform to ergonomics, balance the requirements of a strong frame and a light material, so as to provide the riders with a better riding experience.

However, in the fast-paced life, the bicycle is easy to be lost or stolen if the owner is not careful enough. When it comes to the situation, it is usually not easy to find the bicycles back. Further, many people have symptoms of forgetfulness and often waste a lot of time finding the location they parked their bicycles. In addition, the current bicycles are extremely expensive, with prices ranging from thousands to tens of thousands, or even hundreds of thousands of Taiwan dollars.

Referring to Patent No. TW M432581U, entitled "Rolling post axial-sliding type front fork shock-absorbing device," Patent No. TW M417309U, entitled "Shock absorbing apparatus for front fork of bicycle," and Patent No. TW 572007U, entitled "Shock absorbing front fork structure allowing fast and easy stroke adjustment," the bicycle front fork structures as disclosed in the above-mentioned patents mostly focus on the structure and functions of shock absorption and steering control, and lack the technology about finding and locating bicycles and relevant information.

The tracker (AirTag) launched by Apple is the most popular system with find and locate functions in the market today. The tracker AirTag does not need a specific locator to match with the tracker, and can detect it only through the Bluetooth signal to find lost or stolen items. The tracker AirTag transmits the location of the detected items to iCloud, and users can locate it on the map through the APP.

Therefore, it is necessary to provide an assembly that can be engaged with the tracker (AirTag) and mounted on the bicycle.

SUMMARY OF THE DISCLOSURE

In one aspect, the present disclosure provides a bicycle tracking device assembly, including a connection unit mounted on the bicycle's inner wall and a positioning member. The connection unit includes a first shift block and a second shift block. The first shift block and the second shift block have a first guiding surface and a second guiding surface respectively. The first guiding surface and the second guiding surface complement each other. The positioning member passes through the first shift block and the second shift block, and the connection unit is fixed or detached from the inner wall of the bicycle tube by rotating the positioning member to displace the first shift block and the second shift block.

In another aspect, the present disclosure further provides a bicycle tracker mounting assembly including a connection unit mounted on the inner wall of a bicycle tube. The connection unit includes a first shift block, a second shift block, a first carrier, a second carrier and a positioning member. The first shift block has a first through path and the second shift block has a second through path. The first carrier has a first receiving groove for fitting and shifting the first shift block, and the second carrier has a second receiving groove for fitting and shifting the second shift block. The first shift block is positioned in the first receiving groove of the first carrier and configured to shift with respect to the first carrier, and the second shift block is positioned in the second receiving groove of the second carrier and configured to shift with respect to the second carrier. The first carrier and the second carrier respectively have a first through hole defined in an inner top of the first receiving groove and extending upwardly from the first receiving groove and a second through hole defined in an inner bottom of the second receiving groove and extending downwardly from the second receiving groove. The positioning member has a first end and a second end located at the first through hole and the second through hole, respectively, and the positioning member extends sequentially through the second through hole, through the second through path, through the first through path, and into the first through hole. The connection unit is fixed or disengaged by rotating the positioning member to displace the first shift block and the second shift block.

In certain embodiments, a tracker (can be an AirTag) is mounted on the connection unit.

In certain embodiments, the bicycle tube is a top tube.

In certain embodiments, the first shift block has a first fitting surface and a first guiding surface, and the second shift block has a second fitting surface and a second guiding surface; wherein the first guiding surface and the second guiding surface are complemented each other.

In certain embodiments, the first carrier has a first lower surface with two first retaining protrusions, and the first retaining protrusions form the first receiving groove. In certain embodiments, the second carrier has a second upper surface with two second retaining protrusions, and the second retaining protrusions form the second receiving groove.

In certain embodiments, the second carrier has at least one drainage slot through the second upper surface and the second lower surface.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

The present disclosure is more particularly described in the drawings and following examples that are intended as illustrative only. It is to be understood that these embodiments are exemplary implementations and are not to be construed as limiting the scope of the present disclosure in any way. Further modifications to the disclosed embodiments, as well as other embodiments, are also included within the scope of the appended claims. Regarding the drawings, the relative proportions and ratios of elements in the drawings may be exaggerated or diminished in size for the sake of clarity and convenience. Such arbitrary proportions are only illustrative and not limiting to the scale.

Figure 1:
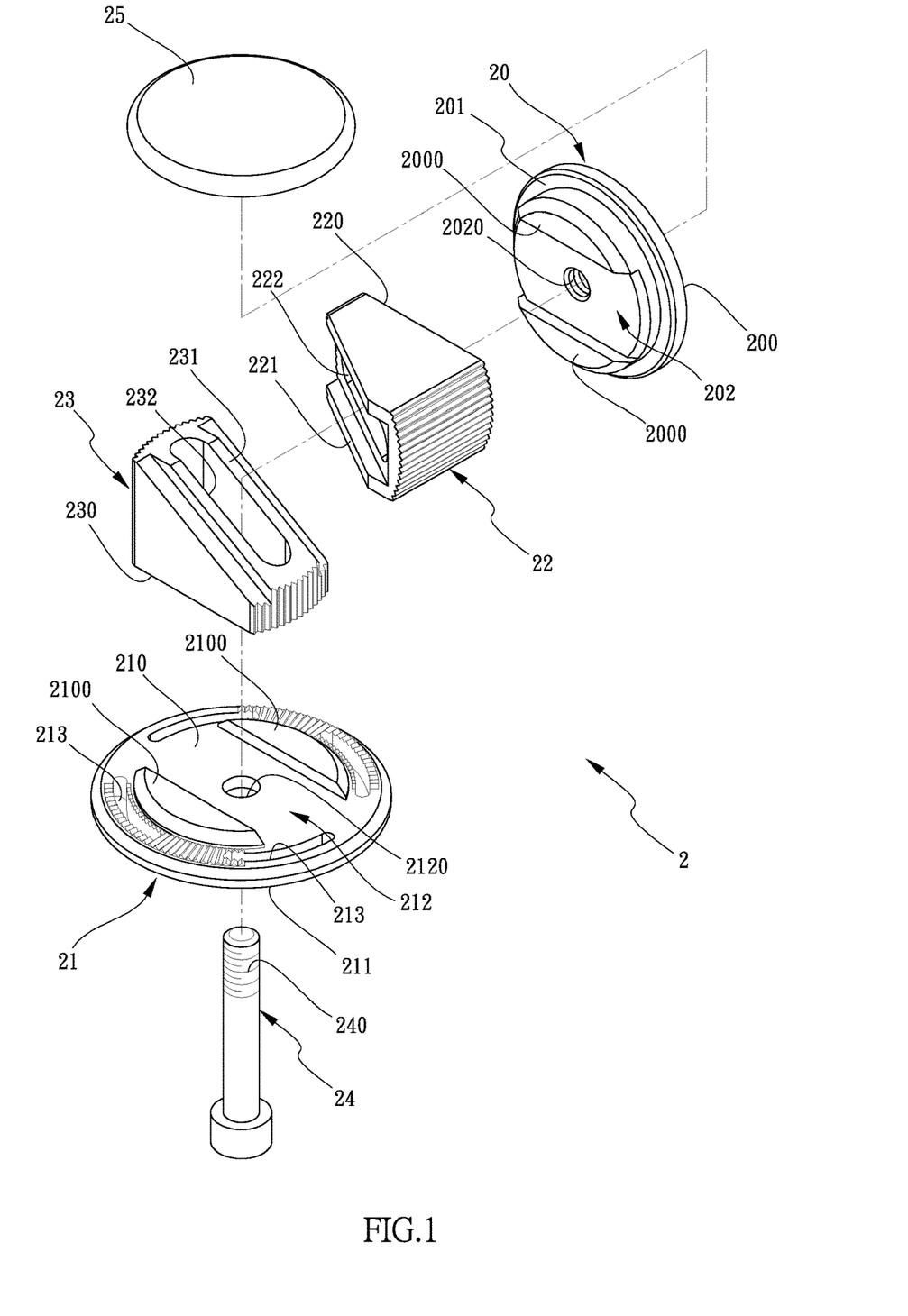
FIG. 1 is an exploded perspective schematic view of the bicycle tracker mounting assembly of the present disclosure.

Referring to FIG. 1, an embodiment of the present disclosure provides a bicycle tracker mounting assembly. The tracker mounting assembly includes a connection unit 2 mounted on the inner wall 1 of a bicycle tube. In one embodiment of the present disclosure, the bicycle tube is a top tube. In detail, the connection unit 2 includes a first carrier 20, a second carrier 21, a first shift block 22, a second shift block 23, and a positioning member 24. The first carrier 20 has a first upper surface 200 and a first lower surface 201, the second carrier 21 has a second upper surface 210 and a second lower surface 211. Further, the first lower surface 201 of the first carrier 20 has two first retaining protrusions 2000, and the first retaining protrusions 2000 form a first receiving groove 202. The second upper surface 210 of the second carrier 21 has two second retaining protrusions 2100 corresponding to the first retaining protrusions 2000, and the second retaining protrusions 2100 form a second receiving groove 212.

The first carrier 20 and the second carrier 21 respectively have a first through hole 2020 defined in an inner top of the first receiving groove 202 and extending upwardly from the first receiving groove 202 and a second through hole 2120 defined in an inner bottom of the second receiving groove 212 and extending downwardly from the second receiving groove 212. Further, the second carrier 21 has at least one drainage slot 213 through the second upper surface 210 and the second lower surface 211.

The first shift block 22 has a first fitting surface 220 and a first guiding surface 221, and the second shift block 23 has a second fitting surface 230 and a second guiding surface 231. Moreover, the first fitting surface 220 of the first shift block 22 fits the first receiving groove 202 of the first carrier 20, and the second fitting surface 230 of the second shift block 23 fits the second receiving groove 212 of the second carrier 21. The first receiving groove 202 and the second receiving groove 212 provide movement space for the first shift block 22 and the second shift block 23. The first guiding surface 221 of the first shift block 22 and the second guiding surface 231 of the second shift block 23 are complemented each other. Furthermore, the first shift block 22 has a first through path 222 and the second shift block 23 member has a second through path 232.

The positioning member 24 has a first end and a second end for positioning at the first through hole 2020 and the second through hole 2120. In one embodiment of the present disclosure, the positioning member 24 is a bolt, and the positioning member 24 has an external thread portion 240, A tracker 25, such as an AirTag, which has find and locate functions, is mounted on the connection unit 2. In one embodiment of the present disclosure, the tracker 25 is mounted on the first upper surface 200 of the first carrier 20 of the connection unit 2.

Figure 2:
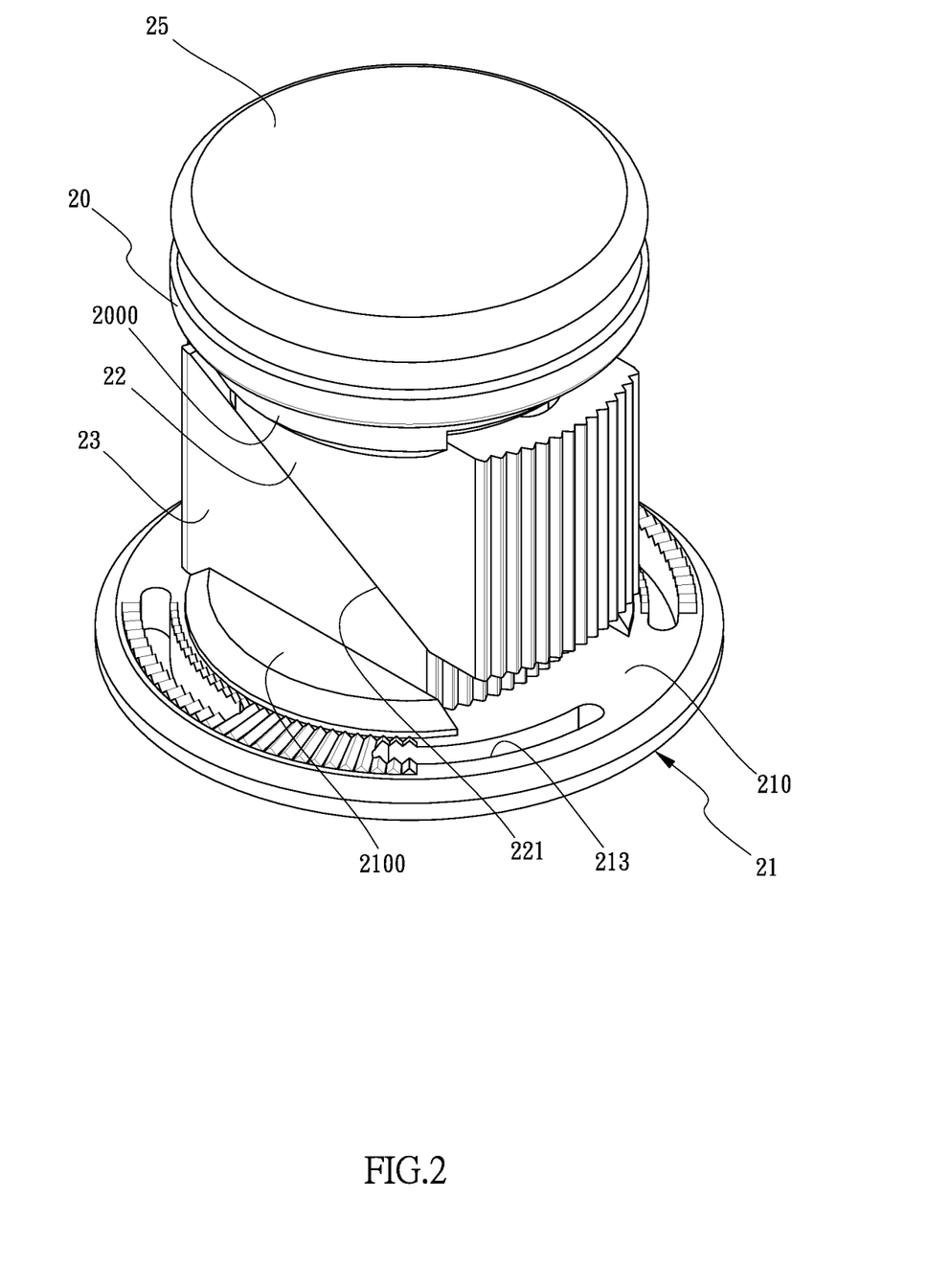
FIG. 2 is an assembled perspective schematic view of the bicycle tracker mounting assembly of the present disclosure.

In operation, as shown in FIG. 2, firstly, fits the second shift block 23 through the second fitting surface 230 in the second receiving groove 212 of the second carrier 21; matches the first guiding surface 221 of the first shift block 22 to the second guiding surface 231 of the second shift block 23, so that the first guiding surface 221 and the second guiding surface 231 are abutted against each other; fits the first shift block 22 through the first fitting surface 220 in the first receiving groove 202 of the first carrier 20.

Secondly, inserts the positioning member 24 through the second through hole 2120 of the second carrier 21, the second through path 232 of the second shift block 23, the first through path 222 of the first shift block 22 sequentially, and limits both ends of the positioning member 24 at the first through hole 2020 of the first carrier 20 and the second through hole 2120 of the second carrier 21. Lastly, disposes the tracker 25 (AirTag) on the first upper surface 200 of the first carrier 20 of the connection unit 2, and the assembling of the bicycle tracker mounting assembly of the present disclosure is completed.

Figure 3:
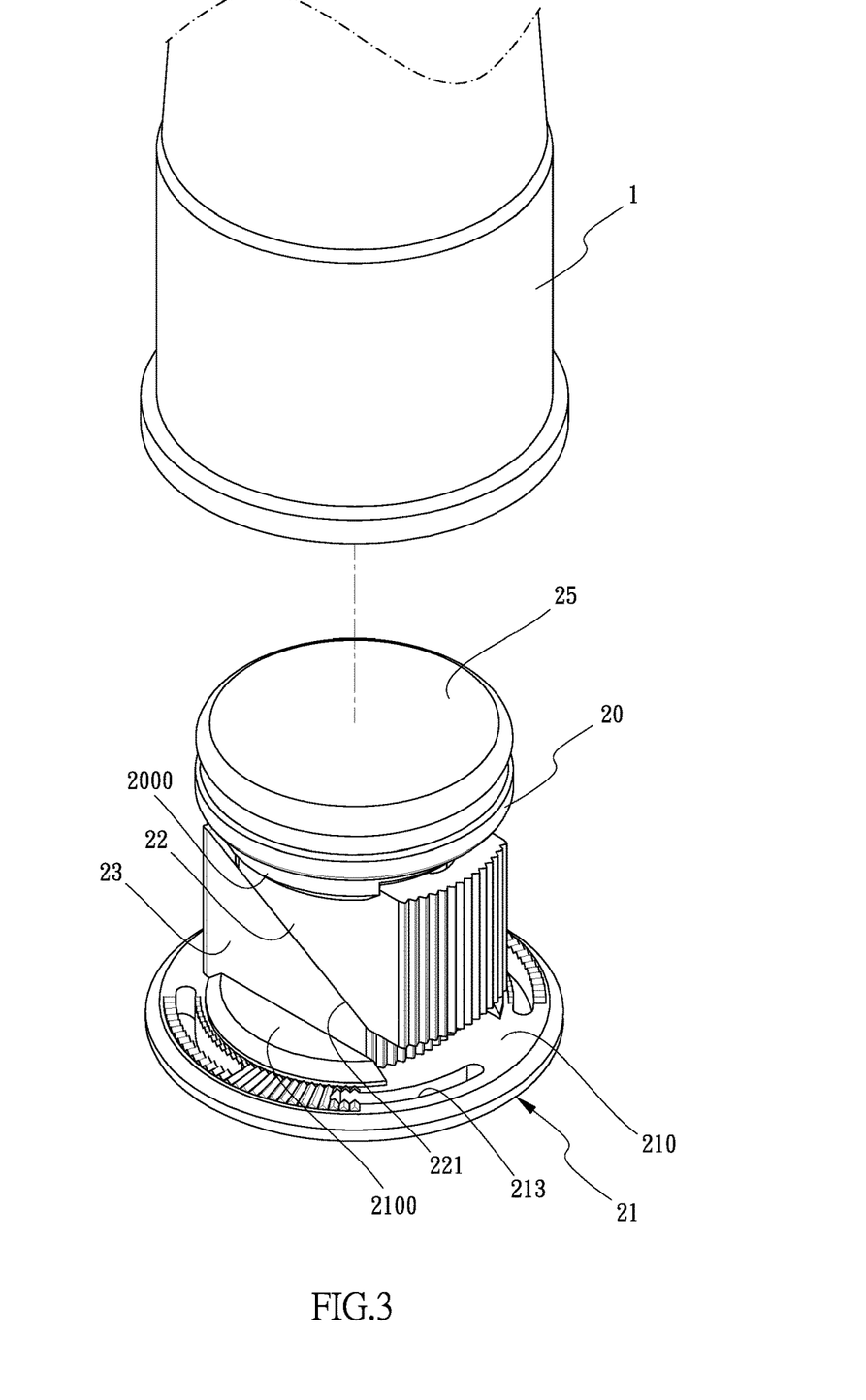
FIG. 3 is an exploded perspective schematic view of the bicycle tracker mounting assembly and the bicycle tube of the present disclosure.
Figure 4:
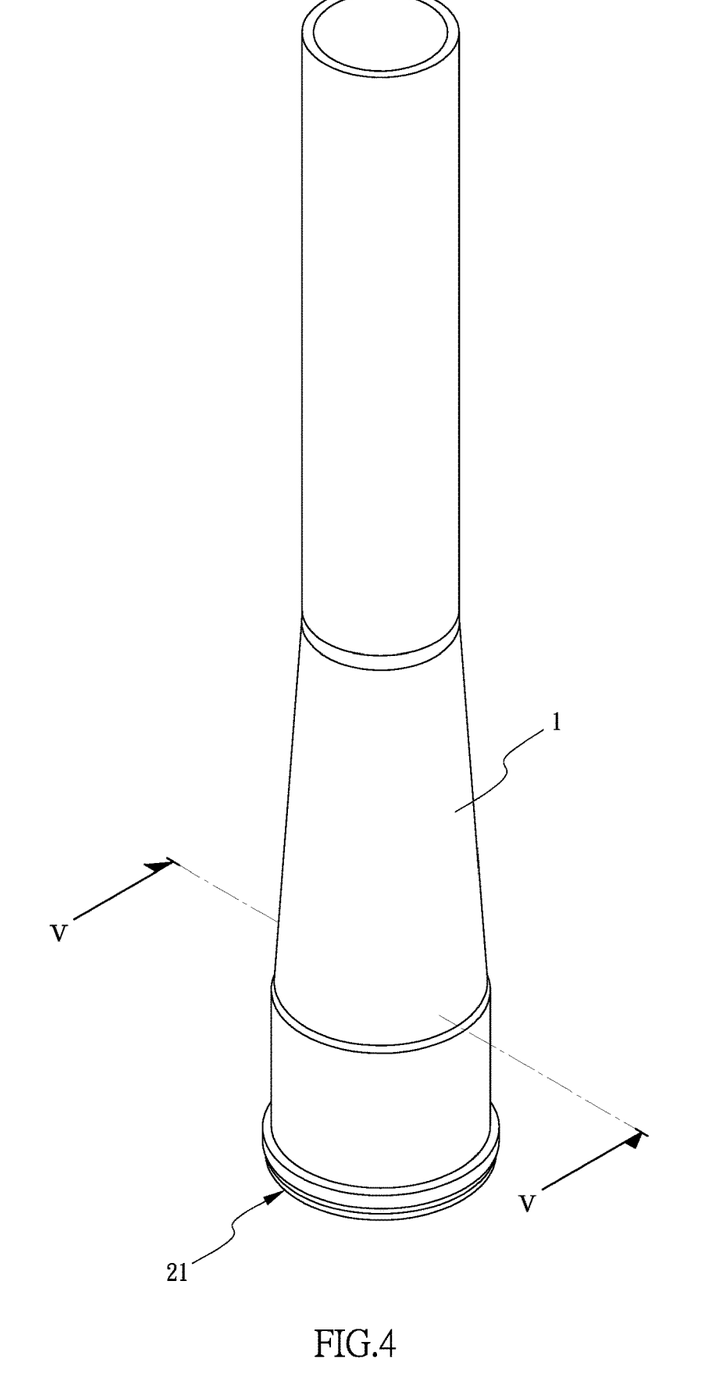
FIG. 4 is an assembled perspective schematic view of the bicycle tracker mounting assembly in the bicycle tube of the present disclosure.
Figure 5:
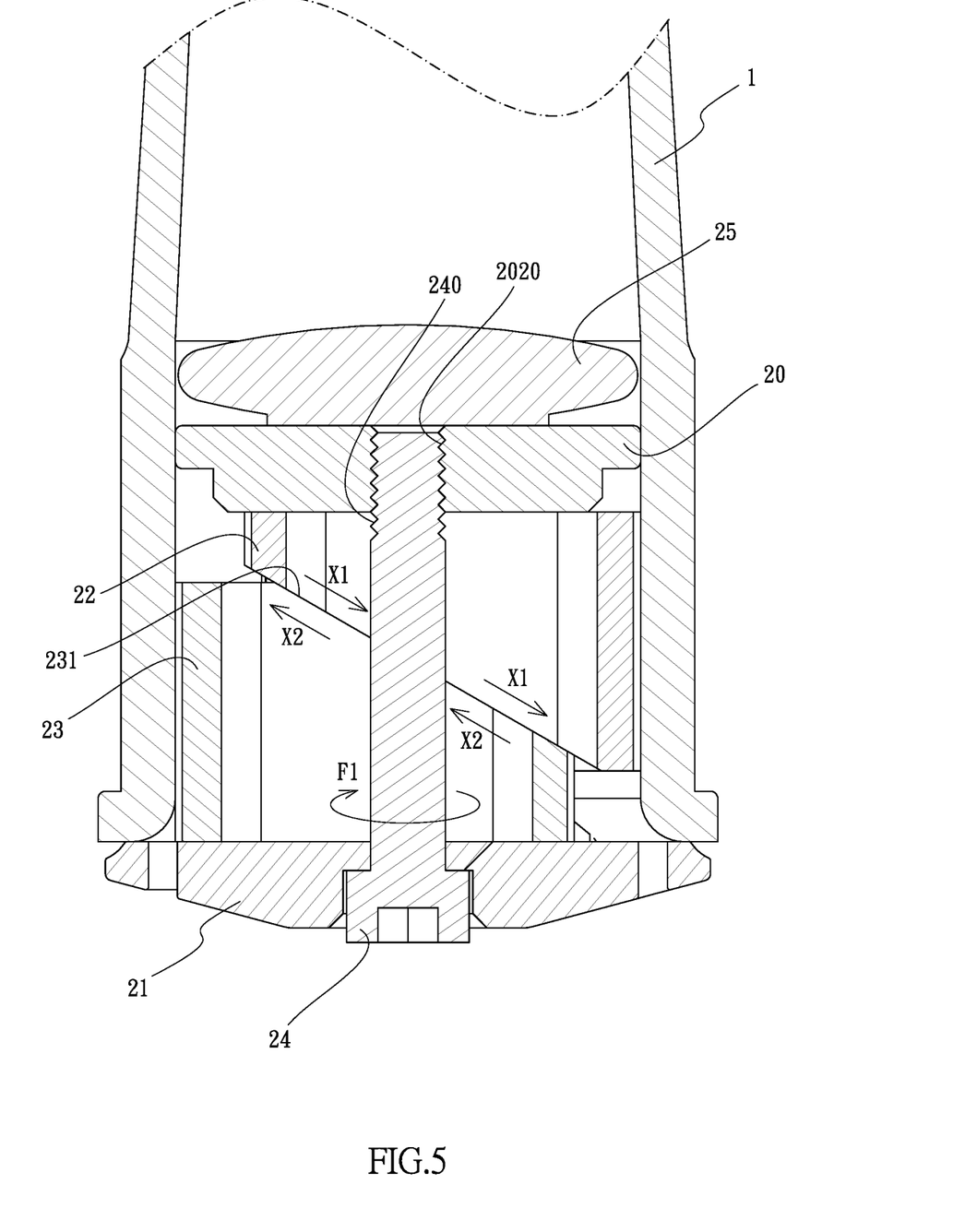
FIG. 5 is a sectional schematic view of line V-V of FIG. 5 of the present disclosure.

In conjunction with FIGS. 3, 4, and 5, the assembled tracker mounting assembly is placed into the inner wall 1 of the tube of the bicycle. The first guiding surface 221 of the first shift block 22 and the second guiding surface 231 of the second shift block 23 are complemented and abutted against each other. By turning the positioning member 24 according to the first rotation direction F1, the first shift block 22 and the second shift block 23 are offset(displace).

More specifically, by turning the positioning member 24 according to the first rotation direction F1, the first shift block 22 is displaced along the first guiding surface 221 toward a first displacement direction X1, and the second shift block 23 is displaced along the second guiding surface 231 toward a second displacement direction X2. By turning the positioning member 24, the first shift block 22 and the second shift block 23 offset relative to each other until the connection unit 2 is fittingly abutted against to the inner wall 1 of the bicycle tube.

In one embodiment of the present disclosure, the first rotation direction F1 is clockwise or counterclockwise.

During the time the rider rides the bicycle out, and the tracker mounting assembly is assembled on the inner wall 1 of the bicycle tube, for example, bicycle front fork top tube, and the Bluetooth system of communication devices such as mobile phones, tablets, smartwatches, or laptops is turned on to connect with the tracker 25 (AirTag). When the bicycle is stolen or the owner forgets the location of the bicycle, the rider only needs to use the APP of the communication device to find the location of the tracker 25 (AirTag) on the map through the network, which allows the rider to quickly find the location of the bicycle, that saves a lot of time and brings great convenience.

In addition, the second carrier 21 of the connection unit 2 has at least one drainage slot 213. More specifically, the second carrier 21 has a plurality of drainage slots 213. In rainy days, the rainwater flows into the inner wall 1 of the bicycle tube accidentally, the shift block 2 can drain the rainwater out of the bicycle pipe through the drainage slot 213 to achieve the drainage function without worry about the tracker mounting assembly will be out of function due to waterlogged bicycle tube.

Figure 6:
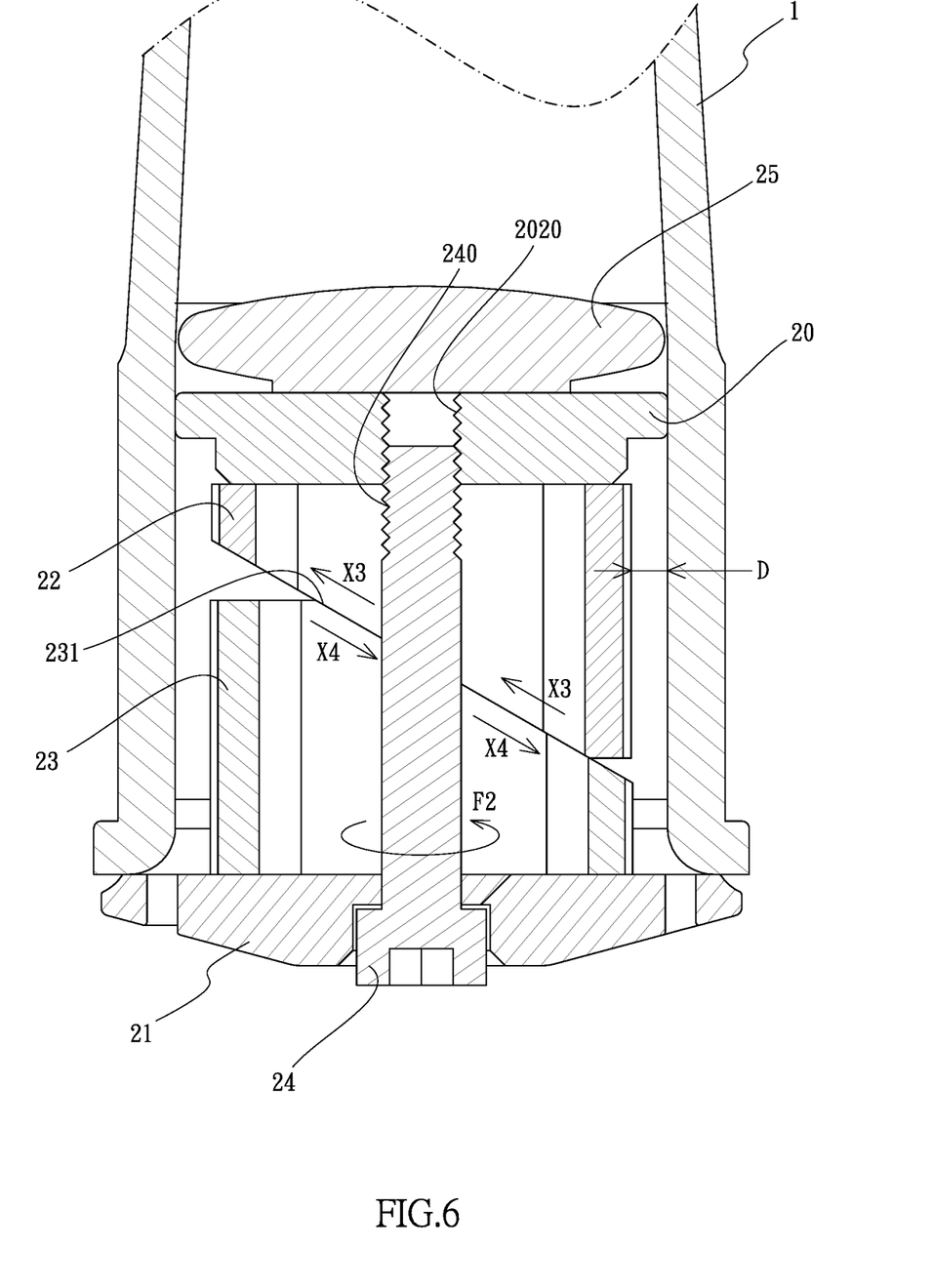
FIG. 6 is a sectional schematic view of the movement of FIG. 5 of the present disclosure.

Further, in conjunction with FIG. 6, when it is a need to replace or repair the tracker 25 (AirTag), the tracker mounting assembly can be removed from the inner wall 1 of the bicycle tube easily. The user only needs to turn the positioning member 24 according to a second rotation direction F2 that is opposite to the first rotation direction F1, the first shift block 22 is displaced along the first guiding surface 221 toward a third displacement direction X3, and the second shift block 23 is displaced along the second guiding surface 231 toward a fourth displacement direction X4. The user turns the positioning member 24 until the first shift block 22 and the second shift block 23 are aligned to provide an appropriate gap D between the connection unit 2 and the inner wall 1 of the bicycle tube, so that the connection unit 2 can be removed from the inner wall 1 of the bicycle tube.

Accordingly, the connection unit 2 can be detached easily to remove the tracker 25.

In one embodiment of the present disclosure, the second rotation direction F2 is clockwise or counterclockwise.

In conclusion, the bicycle tracker mounting assembly of the present disclosure provides the following advantages:
1. The tracker mounting assembly can be applied in the bicycle field, and more particularly, the tracker mounting assembly can be mounted on the bicycle front fork top tube to provide the find and locate functions. Therefore, for the bicycle industry which advocates "enjoy life with bicycle riding", it will greatly increase the public's desire to buy bicycles.
2. The tracker mounting assembly is used to match with the tracker 25, for example, AirTag, which connects the mobile APPs through the Bluetooth system, and all communication devices with the same APP installed, such as mobile phones, tablets, smartwatches or laptops can be applied. The user only needs to use the APP of the communication device to find the location of the tracker 25 (AirTag) on the map through the network. There is no requirement to design a specialized APP locating software to match with communication equipment. In this way, it not only greatly improves user acceptance and convenience, but also saves a lot of time and cost to develop and maintain the specialized APP.
3. The assembly and disassembly between the tracker mounting assembly and the inner wall 1 of the bicycle tube are very simple. The user only needs to turn the positioning member 24 clockwise or counterclockwise to displace the first shift block 22 and the second shift block 23, so as to fix or detach the shift block 2 from the inner wall 1 of the bicycle tube, then the assembly and disassembly of the tracker mounting assembly are completed, which is simple and significantly time-saving.

What is claimed is:

1. A bicycle tracker mounting assembly, comprising a connection unit mounted on an inner wall of a bicycle tube, wherein the connection unit includes:
   a first carrier and a second carrier; wherein the first carrier has a first receiving groove and the second carrier has a second receiving groove; wherein the first carrier has a first through hole defined in an inner top of the first receiving groove and extending upwardly from the first receiving groove, the second carrier has a second through hole defined in an inner bottom of the second receiving groove and extending downwardly from the second receiving groove;
   a first shift block and a second shift block; wherein the first shift block has a first through path and the second shift block has a second through path; wherein the first shift block is positioned in the first receiving groove of the first carrier and configured to shift with respect to the first carrier, the second shift block is positioned in the second receiving groove of the second carrier and configured to shift with respect to the second carrier; and
   a positioning member; wherein the positioning member has a first end and a second end located at the first through hole and the second through hole, respectively; wherein the positioning member extends sequentially through the second through hole, through the second through path, through the first through path, and into the first through hole; wherein the connection unit is configured to be fixed to the inner wall of the bicycle tube or disengaged from the inner wall of the bicycle tube by rotating the positioning member to displace the first shift block and the second shift block.

2. The bicycle tracker mounting assembly according to claim 1, wherein a tracker is mounted on the connection unit.

3. The bicycle tracker mounting assembly according to claim 1, wherein the bicycle tube is a top tube.

4. The bicycle tracker mounting assembly according to claim 1, wherein the positioning member is configured to rotate in a clockwise direction and a counterclockwise direction.

5. The bicycle tracker mounting assembly according to claim 1, wherein the first shift block has a first fitting surface and a first guiding surface, and the second shift block has a second fitting surface and a second guiding surface; wherein the first guiding surface and the second guiding surface are complementary to each other.

6. The bicycle tracker mounting assembly according to claim 1, wherein the first carrier has a first upper surface and a first lower surface, the second carrier has a second upper surface and a second lower surface.

7. The bicycle tracker mounting assembly according to claim 6, wherein the second carrier has at least one drainage slot through the second upper surface and the second lower surface.

8. The bicycle tracker mounting assembly according to claim 1, wherein the positioning member is a bolt, and the positioning member has an external thread portion; wherein the first through hole has an internal thread portion matching the external thread portion of the positioning member.

\* \* \* \* \*